United States Patent [19]

Tsutsumi

[11] 4,406,940

[45] Sep. 27, 1983

[54] LASER PROCESSING MACHINE

[75] Inventor: Akira Tsutsumi, La Mirada, Calif.

[73] Assignee: Amada Engineering & Service Co., Inc., La Mirada, Calif.

[21] Appl. No.: 313,811

[22] Filed: Oct. 22, 1981

[30] Foreign Application Priority Data

Oct. 23, 1980 [JP] Japan ............................ 55-147676
Jun. 17, 1981 [JP] Japan ............................ 56-092392

[51] Int. Cl.³ ............................................ B23K 27/00
[52] U.S. Cl. ....................... 219/121 LV; 219/121 LG; 219/121 L
[58] Field of Search ................. 219/121 LV, 121 LG, 219/121 LN, 121 LY, 121 LC, 121 LD, 121 L, 121 LM

[56] References Cited

U.S. PATENT DOCUMENTS

| 3,569,660 | 3/1971 | Houldcroft | 219/121 FS X |
| 3,576,965 | 5/1971 | Gugger | 219/121 LV X |
| 3,740,524 | 6/1973 | Dahlberg et al. | 219/121 FS X |
| 3,749,878 | 7/1973 | Sullivan et al. | 219/121 FS X |
| 4,031,351 | 6/1977 | Martin | 219/121 FS X |

FOREIGN PATENT DOCUMENTS

| 52-74197 | 6/1977 | Japan | 219/121 LR |
| 55-11436 | 3/1980 | Japan . | |
| 55-11953 | 3/1980 | Japan . | |
| 55-12352 | 4/1980 | Japan . | |
| 55-16756 | 5/1980 | Japan . | |
| 55-47452 | 11/1980 | Japan . | |

*Primary Examiner*—C. L. Albritton
*Attorney, Agent, or Firm*—Wigman & Cohen

[57] ABSTRACT

The present invention relates to a laser machine having a head assembly for processing a workpiece. A lens is disposed in the head assembly for condensing a laser beam and a nozzle is arranged beneath the lens for applying the laser beam to the workpiece. A device is connected in the head assembly for vertically moving the lens and the nozzle together in fixed relation to each other. The device includes an adjustable motor. Also, the nozzle is detachably mounted onto a lower end of the head assembly. Furthermore, the laser machine comprises an arrangement for counterbalancing the weight of the nozzle as well as shock absorbers for handling vibrations caused by vertical movement of the lens and the nozzle.

5 Claims, 9 Drawing Figures

LASER PROCESSING MACHINE

BACKGROUND OF THE INVENTION

1. Field of the Invention

The present invention relates to laser processing machines which can process sheet-like workpieces such as sheet metals by various methods such as cutting and piercing by use of laser beams produced by laser resonators.

2. Description of the Prior Art

As is well-known, laser beams are widely used in industries to process a variety of metallic and nonmetallic materials such as irons, nickels, plastics, rubbers and glasses. In laser processing, the laser beams are produced by a laser resonator and are applied together with an assisting gas such as oxygen gas ($O_2$) to a material to be processed through a nozzle after being focussed by a condenser lens.

Heretofore, however, the laser beams have been little used to process sheet-like workpieces such as sheet metals in large quantities by cutting and piercing, and there have been no machines specially designed to process sheet-like workpieces. As a matter of importance, in order to perform an accurate and fine processing by use of the laser beams, it is necessary to focus the laser beam by the condenser lens to a minimal diameter on the workpieces to be processed. For this purpose, it has been desired to accurately adjust the focal position of the condenser lens according to sizes or thicknesses of the workpieces to be processed. Also, since sheet-like workpieces such as sheet metals are more or less bent or warped, it is desired to feed such sheet-like workpieces so that portions thereof to be processed may be located at the focussed point of the laser beam, namely, the focal point of the condenser lens. Therefore, it is also desired to resiliently change the focal position of the condenser lens during processing according to the bends or warps of the sheet-like workpieces. Furthermore, it has been desired to easily change the condenser lens for focussing the laser beams since the condenser lens is liable to be deteriorated.

SUMMARY OF THE INVENTION

It is a general object of the present invention to provide a novel laser processing machine which can process sheet-like workpieces such as sheet metals with accuracy by use of a laser beam.

It is a specific object of the present invention to provide a laser processing machine in which the condenser lens for focussing the laser beam can be easily adjusted in focal position according to the thiknesses of the workpieces to be processed.

It is another specific object of the present invention to provide a laser processing machine in which the condenser lens for focussing the laser beam can be resiliently moved to change in focal position in response to bends or warps of the workpieces to be processed.

It is another object of the present invention to provide a laser processing machine in which the workpiece to be processed, even if bent or warped, can be fed to the focal position of the condenser lens for focussing the laser beam without being damaged.

It is a further object of the present invention to provide a laser processing machine in which the condenser lens for focussing the laser beam can be easily changed.

It is a still further object of the present invention to provide a laser processing machine with a safety device for the condenser lens and related components.

Other and further objects and advantages of the present invention will be apparent from the following description and accompanying drawings which, by way of illustration, show preferred embodiments of the present invention and the principles thereof.

DESCRIPTION OF THE PREFERRED EMBODIMENTS

Figure 1:
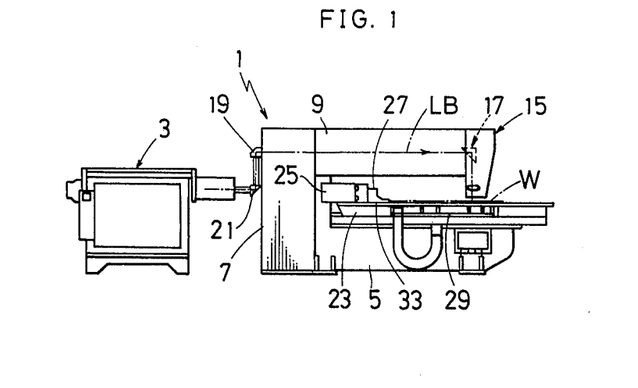
FIG. 1 is a side elevational view of a laser processing machine embodying the principles of the present invention.
Figure 2:
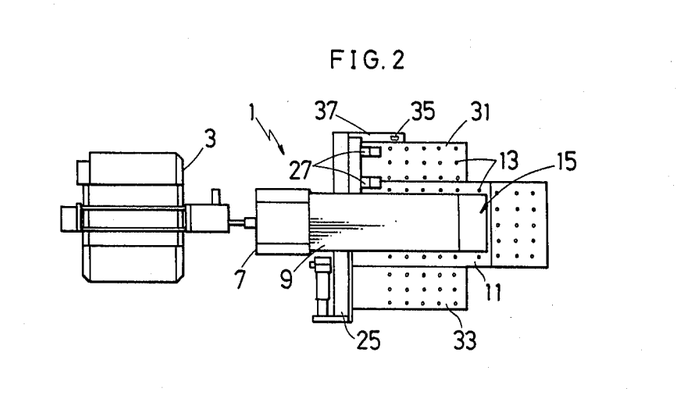
FIG. 2 is a plan view of the laser processing machine shown in FIG. 1.

Referring now to FIGS. 1 and 2, there is shown a laser processing machine 1 which is generally designated by the numeral 1 and is connected with a laser resonator 3 such as a $CO_2$ (carbon dioxide gas) laser resonator. The laser resonator 3 may be a commercially available one, and it is so arranged as to produce laser beam LB and deliver it to the laser processing machine 1 as shown by the arrow in FIGS. 1 and 4.

The laser processing machine 1 comprises a base 5, a post 7 vertically formed or fixed to one end of the base 5 and an overhead beam 9 horizontally supported over the base 5 by the post 7 in a cantilever manner. The base 5 is provided at its top with a fixed table 11, shown in FIG. 2, having a number of slide balls 13 on which a workpiece W such as a sheet metal is horizontally placed to be processed. The overhead beam 9 is provided at its forward end with a processing head assembly 15 which includes a mirror assembly 17, shown in phantom lines in FIG. 1, and will be described in great detail hereinafter. The laser processing machine 1 of the above construction is so arranged as to receive the laser beam LB from the laser resonator 3 and apply the laser beam LB to the workpiece W through the processing head assembly 15 as shown by the arrow to process the workpiece W. Also, the mirror assembly 17 is arranged to reflect the laser beam LB delivered from the laser resonator 3 toward the workpiece W, and two more mirror assemblies 19 and 21 are provided to transmit the laser beam LB from the laser resonator 3 to the mirror assembly 17 in the preferred embodiment.

In order to feed and position the workpiece W to be processed, the laser processing machine 1 is provided with a first carriage 23 horizontally movable and a second carriage 25 which holds a plurality of clamping means 27 for clamping the workpiece W and is slidably mounted on the first carriage 23. The first carriage 23 is slidably mounted on a pair of rails 29 which are fixed on the upper portion of the fixed table 11 is parallel with each other so that it may moved toward and away from the processing zone just beneath the processing head assembly 15 when driven by power. The second carriage 25 holding the clamping means 27 is mounted on the first carriage 23 so that it may be horizontally moved by power at right angles with the rails 29. The clamping means 27 are detachably and adjustably fixed to the second carriage 25 so that they may be adjusted according to the width of the workpiece W to be processed. Also, in order to hold the extending ends of the workpiece W, a pair of movable tables 31 and 33 having a number of slide balls 13 may be fixed to the first carriage 23 so that they can be moved together with the workpiece W by the first carriage 23. Furthermore, in order to initially position the workpiece W on the fixed table 11, a retractable stopper means 35 is provided on an arm member 37 which is horizontally fixed to a portion of the laser processing machine 1. Thus, the workpiece W can be initially positioned on the fixed table 11 when it is changed with its end held in contact with the stopper means 35 by the clamping means 27 which have been placed by the first carriage 23 at the original location next to the post 7.

In the above described arrangement, the workpiece W which is gripped by the clamping means 27 can be fed beneath the processing head assembly 15 by moving the first and second carriages 23 and 25 by power. The workpiece W, when positioned just beneath the processing head assembly 15, is cut and pierced by the laser beam LB which is produced by the laser resonator 3 and is delivered by means of the mirror assemblies 17, 19 and 21 and then sent out vertically and downwardly through the processing head assembly 15 together with an assisting gas such as oxygen gas. Also, the workpiece W can be automatically and continuously cut and pierced by moving the first and second carriages 23 and 25 under a numerical control which is preprogrammed.

Figure 3:
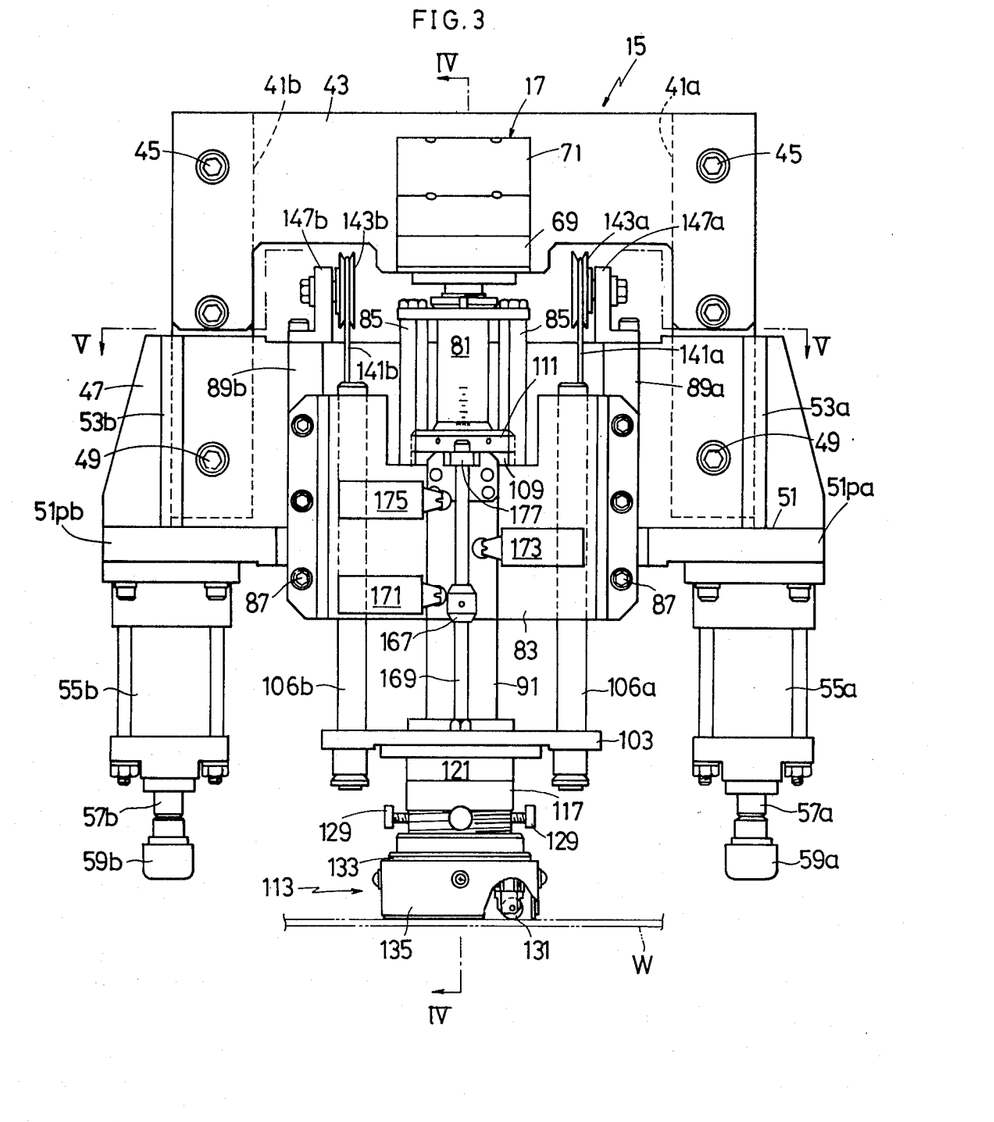
FIG. 3 is a front elevational view showing as a first embodiment of the present invention a front portion of the laser processing machine shown in FIGS. 1 and 2.
Figure 4:
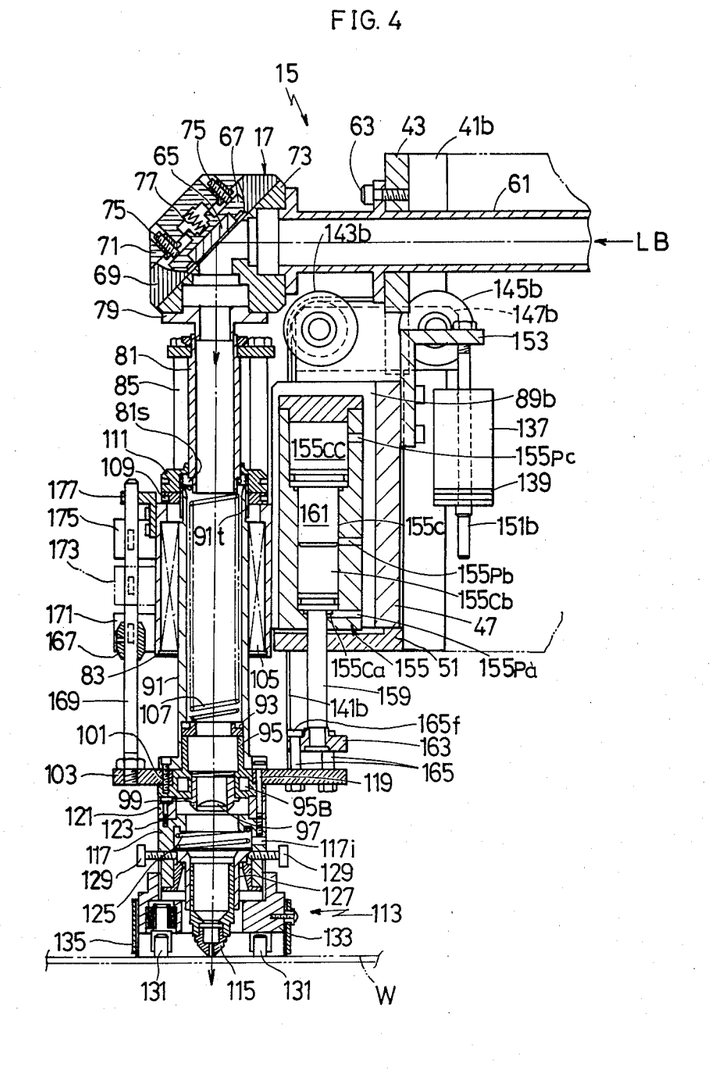
FIG. 4 is a sectional view taken along the line IV—IV of FIG. 3.
Figure 5:
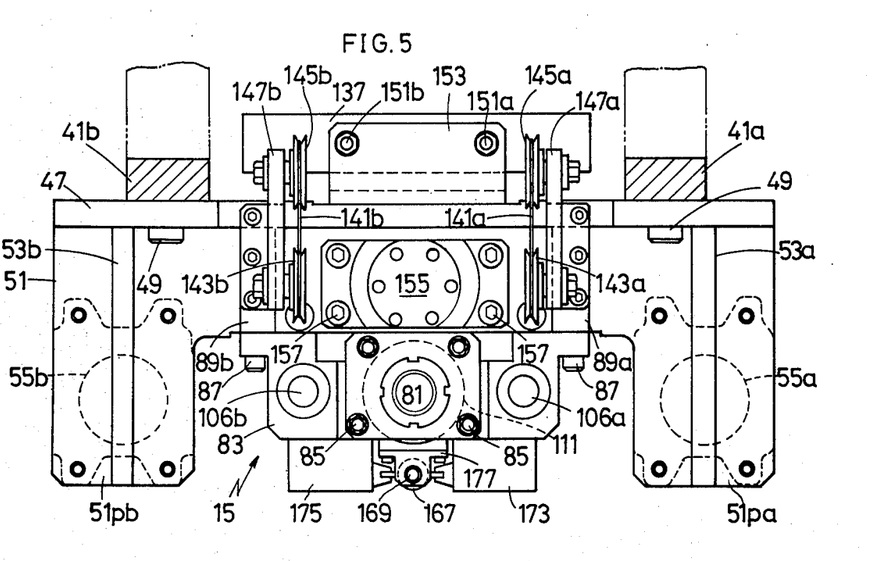
FIG. 5 is a sectional view taken along the line V—V of FIG. 3.

Referring to FIGS. 3, 4 and 5, the processing head assembly 15 of a first embodiment including the mirror assembly 17 is mounted on a pair of holding blocks 41a and 41b which are rectangular in cross-section and are vertically fixed to the front end of the overhead beam 9. The processing head assembly 15 comprises an upper base plate 43 which is vertically fixed to the holding blocks 41a and 41b by a plurality of bolts 45, and it comprises also a lower base plate 47 which is also vertically fixed to the holding blocks 41a and 41b by a plurality of bolts 49. The lower base plate 47 has a horizontal plate 51 which is provided at its opposite ends with horizontal projections 51pa, 51pb and is reinforced by a pair of ribs 32a and 53b.

As shown in FIG. 3, in order to hold the workpiece W, a pair of pneumatic or hydraulic motors 55a and 55b are provided at the bottoms of the horizontal projections 51pa and 51pb, respectively, of the horizontal plate 51. The penumatic or hydraulic motors 55a and 55b are provided with piston rods 57a and 57b, respectively, having holding pads 59a and 59b, respectively, and they are so disposed that their piston rods 57a and 57b can vertically downwardly extend to hold the workpiece W on the fixed table 11. The pneumatic or hydraulic motors 55a and 55b are mainly used to hold the workpiece W when it is required to release the workpiece W and then clamp other portions of the workpiece W by the clamping means 27.

As shown in FIG. 4, a conduit 61 is horizontally disposed through the upper portion of the upper base plate 43 so as to deliver the laser beam LB from the laser resonator 3 to the mirror assembly 17. The conduit 61 is horizontally fixed to the upper portion of the upper base plate 43 by a plurality of bolts 63 and is connected at its projecting end to the mirror assembly 17. Thus, the laser beam LB delivered from the laser resonator 3 is reflected at a 90° angle by the mirror assembly 17 and is further transmitted vertically downwardly as is shown by the arrow.

As is also shown in FIG. 4, the mirror assembly 17 comprises a mirror 65 which is held by a holding member 67 in a casing 69 covered by a cap member 71 and comprises also a frame member 73 having a L-shaped hole through which the laser beam LB is reflected. The holding member 67 holding the mirror 65 is spherically formed so that it may be rotated in the casing 69 to adjust the angle of the mirror 65, and it is adjustably held in the casing 69 by a plurality of bolts 75 and is biased by a spring 77. Thus, the angle of the mirror 65 can be adjusted by rotating the holding member 67 in the casing 69 so that the laser beam LB can be reflected at a 90° angle when passing through the mirror assembly 17.

The mirror assembly 17 is downwardly connected by a connecting sleeve member 79 to a fixed tube member 81 and is held thereby so that the laser beam LB reflected by the mirror assembly 17 can be transmitted vertically downwardly. The fixed tube member 81 is formed at its lower end with an annular shoulder 81s for a purpose to be seen hereinafter, and it is vertically mounted on a holding housing member 83 and is fixed thereto by a plurality of rod members 85. As best seen from FIGS. 3 and 5, the holding housing member 83 is of a somewhat box-like frame and is fixed by a plurality of bolts 87 to a pair of brackets 89a and 89b which are vertically fixed to the lower base plate 47 in parallel with each other.

As best shown in FIG. 4, a movable tube member 91, which is formed at the uppermost portion with a thread 91t, is vertically connected to the lower end of the fixed tube member 81 in a telescopic manner. More specifically, the movable tube member 91 is larger in diameter than the fixed tube member 81, and the lower end of the fixed tube member 81 is inserted in the upper end of the movable tube member 91 so that the movable tube member 91 can move vertically telescopically with regard to the fixed tube member 81. The movable tube member 91 is provided at its inner lower end with an annular spring shoe 93, a sleeve-like cooling member 95 having an annular bore 95B for coolant and a condenser lens 97 held by a sleeve-like holding member 99. The annular spring shoe 93 is placed on the sleeve-like cooling member 95 in the movable tube member 91 for a purpose to be described hereinafter, and the sleeve-like cooling member 95 is inserted in the lowermost end of the movable tube member 91 and is fixed thereto by a plurality of bolts 101 together with a plate member 103 which will be described in detail hereinafter. Also, the sleeve-like holding member 99 holding the condenser lens 97 is detachably secured into the sleeve-like cooling member 95 so that the condenser lens 97 may be cooled by the coolant which is circulated through the annular bore 95B of the sleeve-like cooling member 95. Thus, the laser beam LB delivered from the laser resonator 3 and reflected by the mirror assembly 17 is vertically downwardly transmitted through the fixed and movable tube members 81 and 91 and is focussed by the condenser lens 97 at the lower end of the movable tube member 91.

The movable tube member 91 is vertically movably held and guided by a ball bush assembly 105 which is fixedly held in the holding housing member 83, and it is further guided by a pair of guide rods 106a and 106b, shown in FIGS. 3 and 5, which are vertically fixed to the top of the plate member 103 in parallel with each other and are vertically held by the holding housing member 83. The movable tube member 91 is downwardly biased by a helical spring 107, shown in FIG. 4 which is biased in the movable tube member 81 between the shoulder 81s of the fixed tube member 81 and the annular spring shoe 93. Also, in order to vertically adjustably move and fix the movable tube member 91, an adjusting nut 109 is provided together with a locking nut 111 to engage with the thread 91t of the movable tube member 91. The adjusting rod 109 is normally fixed by the locking nut 111 to the thread 91t of the movable tube member 91, and it is prevented by the top of the holding housing member 83 from lowering to the movable tube member 91. However, the adjusting nut 109 is not stopped from going up from the top of the holding housing member 83 so that the movable tube member 91 can be upwardly moved. Thus, the movable tube member 91 is held by the adjusting nut 109 and can be adjusted in normal height by rotating the adjusting nut 109, but it can resiliently move upwardly against the spring 107 when pushed upwardly. Accordingly, it will be understood that the condenser tube 97 held by the movable tube member 91 can be adjusted in its focal position by rotating the adjusting nut 109 and also it can be resiliently moved upwardly when the movable tube member 91 is pushed upwardly.

As seen from FIGS. 3 and 4, a nozzle assembly 113 is provided at the lower end of the movable tube member 91 so as to apply the laser beam LB to the workpiece W together with an assisting gas such as oxygen. The nozzle assembly 113 comprises a nozzle 115 and a sleeve-like nozzle holding member 117 which is provided with an inlet 117i for the assisting gas and is fixedly connected to the sleeve-like cooling member 95 by a plurality of bolts 119 by means of a ring member 121 fixed thereto by a plurality of bolts 123. The nozzle 115 is held by a helical spring 125 downwardly biased in a ring-like holding member 127 held in the sleeve-like nozzle holding member 117 so that it may be resiliently moved upwardly when pushed upwardly. Also, the nozzle 115 is so disposed as to be adjusted in position by a plurality of adjusting bolts 129 in order to apply the laser beam LB effectively to the workpiece W. In this arrangement, it will be understood that the nozzle assembly 113 can be easily detached from the lower end of the movable tube assembly 91 by releasing the bolts 119 to change the condenser lens 97.

As is also seen from FIGS. 3 and 4, a plurality of Castor rollers 131 are provided on an annular holding member 133 which is secured to the nozzle assembly 113 so that they can roll on bent or warped portions of the workpiece W which is being fed beneath the nozzle 115. In this arrangement, when bent or warped portions of the workpiece W are being fed beneath the nozzle 115, the castor rollers 131 will be rotated and raised by the workpiece W to raise the nozzle assembly 113 and the movable tube member 91 together with the condenser lens 97 against the helical spring 107. Thus, it will now be understood that the condenser lens 97 will be resiliently moved by the movable tube member 91 by means of the castor rollers 131 to change its focal position in response to bends or warps of the workpiece W to be processed.

There is fixed to the annular holding member 133 a detecting means 135 which is electrically so arranged as to stop the first and second carriages 23 and 25 from moving and, if necessary further stop the laser beam LB from being delivered when contacted by any obstruction. Thus, as soon as some obstruction is brought into contact with the detecting means 135, the first and second carriages 23 and 25 or the entire laser processing machine 1 will be stopped to protect the processing head assembly 15 including the condenser lens 97.

As seen from FIGS. 4 and 5, in order to enable the movable tube member 91 and the other members to resiliently smoothly rise and fall, there is provided a balancing weight 137 consisting of a plurality of plate members 139 to be adjusted in weight.

The balancing weight 137 is connected with the plate member 103 by a pair of wires 141a and 141b, best shown in FIG. 5, which are trained around a pair of pulleys 143a and 143b, respectively, and also around another pair of pulleys 145a and 145b, respectively. The pulleys 143a and 145a and the pulleys 143b and 145b are rotatably disposed on a pair of brackets 147a and 147b, respectively, which are fixed to the brackets 89a and 89b, respectively. Also, the balancing weight 137 is vertically movably guided by a pair of guide rods 151a and 151b which are vertically held by a L-shaped bracket 153 fixed to the upper portion of the lower base plate 47. In this arrangement, the balancing weight 137 will vertically moved, when the movable tube member 91 shown in FIG. 4 and the other members are vertically moved, so as to balance their weight and enable them to be resiliently smoothly moved.

Referring to FIGS. 3 and 4, in order to raise the movable tube member 91 together with the other members, a pneumatic or hydraulic motor 155 of a cylinder type having a chamber 155c is mounted on the horizontal plate 51 and is fixed thereto by a plurality of bolts 157 shown in FIG. 5. In the preferred embodiment, the pneumatic or hydraulic motor 155 is of a three position type which is provided with a first piston and rod 159 shown in FIG. 4 and a second piston and rod 161 dividing the chamber 155c into three chambers 155ca, 155cb and 155cc having ports 155pa, 155pb and 155pc. The first piston and rod 159 is downwardly extendably projected out of the chamber 155c of the motor 155 and is provided at its lower end with a holding member 163 for holding a plurality of pins 165 which are vertically fixed to the top of the plate member 103. The pins 165 are each provided at their tops with a flange 165f to be held by the holding member 163, and they are vertically slidably held by the holding member 163 so that the movable tube member 91 can be resiliently moved up and down when the first piston and rod 159 is fully extended. In this arrangement, when the workpiece W is to be processed, the first piston and rod 159 is kept fully extended with the chambers 155cb and 155cc supplied with the pneumatic or hydraulic fluid so that the movable tube member 91 and the other members can be at their lowermost position to process the workpiece W. Also, as will be now understood, the movable tube member 91 and the other members will be half raised when the chamber 155ca and 155cc are supplied with the pneumatic or hydraulic fluid and they will be fully raised to their uppermost limit when the chamber 155ca is supplied with the pneumatic or hydraulic fluid. Of course, when the movable tube member 91 is raised together with the other members by the pneumatic or hydraulic motor 155, the nozzle assembly 113 can be removed by releasing the bolts 119 and therefore the condenser lens 97 can be easily changed.

As seen also from FIGS. 3 and 4, a dog member 167 fixed to a rod member 169 and three detecting means 171, 173 and 175 such as limit switches are provided to detect the height of the first piston and rod 159 of the pneumatic or hydraulic motor 155, that is, the vertical position of the movable tube member 91 and the members held thereby. The rod member 169 holding the dog member 167 is vertically fixed to the top of the plate member 103 and is vertically slidably held and guided by a guide member 177 which is fixed to the front portion of the holding housing member 83. The detecting means 171, 173, and 175 are fixed to the front portion of the holding housing member 83 so that they may be contacted by the dog member 167 which will be vertically moved together with the plate member 103 when the movable tube member 91 is vertically moved. Also, the detecting means 171, 173, and 175 are so arranged as to be contacted by the dog member 167, when the first piston and rod 159 is at the lowermost, midway and uppermost positions, respectively. Furthermore, the detecting means 171 is arranged to allow the laser beam LB to be emitted out of the nozzle 115 when contacted by the dog member 167, while the detecting means 173 and 175 are so arranged as to stop the laser beam LB from being emitted out of the nozzle 115. Thus, it will be understood that the laser beam LB is emitted out of the nozzle 115 only when the first piston and rod 159 is fully extended to allow the movable tube member 91 and the nozzle assembly 113 to be at their operational position to process the workpiece W. Also, it will be understood that the laser beam LB will not be emitted in order to avoid danger when the movable tube member 91 is raised to enable the nozzle assembly 113 to be removed.

Figure 6:
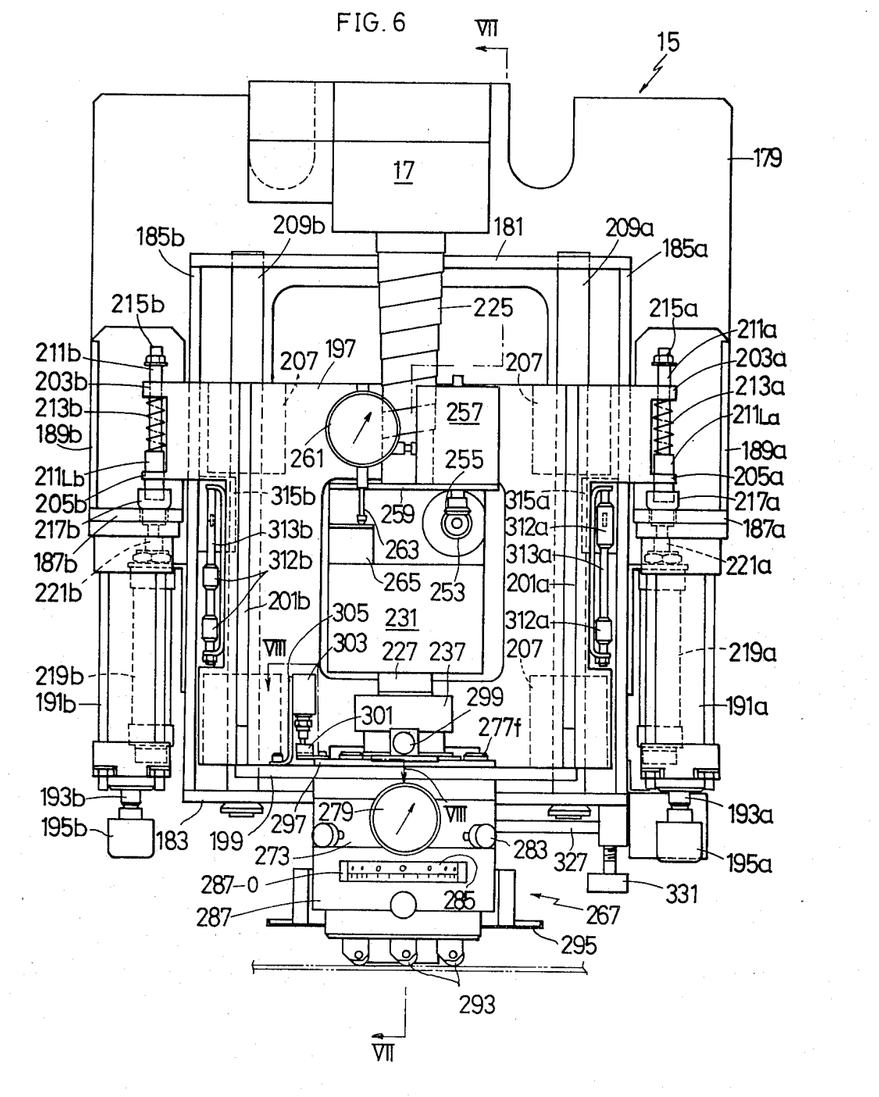
FIG. 6 is a front elevational view showing as a second embodiment of the present invention a front portion of the laser processing machine shown in FIGS. 1 and 2.
Figure 7:
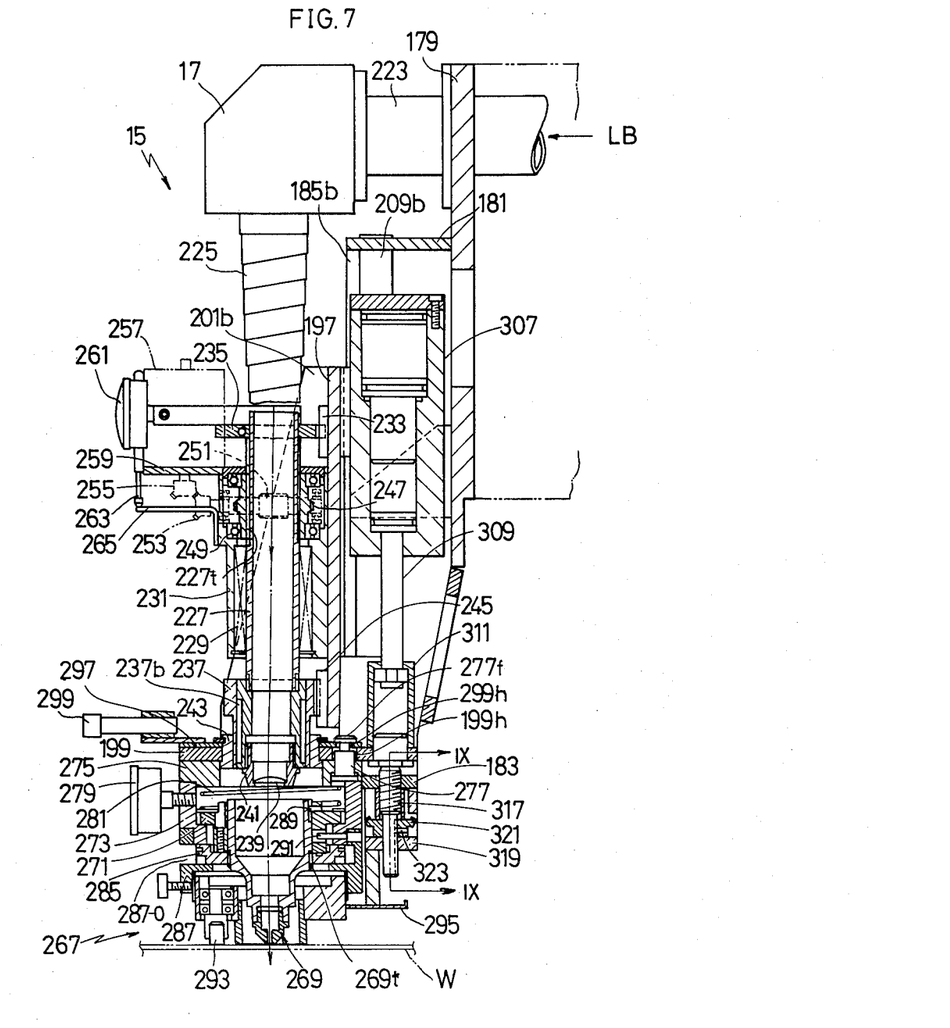
FIG. 7 is a sectional view taken along the line VII—VII of FIG. 6.

Referring to FIGS. 6 and 7, there is shown a second embodiment of the processing head assembly 15 which has a mirror assembly 17 of the same construction as the first embodiment. The processing head assembly 15 of the second embodiment comprises a rectangular base plate 179 on which an upper plate 181 and a lower plate 183 are horizontally fixed and also a pair of side plates 185a and 185b are vertically fixed in parallel with each other. More specifically, the side plates 185a and 185b are so disposed as to connect the ends of the upper and lower plates 181 and 183 in such a manner as to form a box-like frame on the base plate 179.

The base plate 179 is provided at its opposite sides with a pair of horizontal supporting plates 187a and 187b which are horizontally frontwardly projected and are reinforced by ribs 189a and 189b, respectively. The horizontal supporting plates 187a and 187b are provided at their undersides with pneumatic or hydraulic motors 191a and 191b, respectively, which have piston rods 193a and 193b, respectively, having holding pads 195a and 195b, respectively, in the same manner as the first embodiment.

As seen from FIG. 6, there is provided a rectangular plate-like carrier member 197 which is vertically disposed and is provided at its lower end with a horizontal shelf-like plate 199 reinforced by a pair of vertical ribs 201a and 201b. The carrier member 197 is further provided at its opposite upper sides with upper projections 203a and 203b and lower projections 205a and 205b which are formed with vertical bores as will be soon understood hereinafter. The carrier member 197 of this construction is vertically slidably held and guided by means of bushing 207 by a pair of guide rods 209a and 209b which are vertically fixed between the upper and lower plates 181 and 183 in parallel with each other. Also, the carrier member 197 is normally held on the horizontal supporting plates 187a and 187b by means of a pair of holding rod members 211a and 211b having lower larger portions 211La and 211Lb and a pair of helical springs 213a and 213b in such a manner as to be readily moved upwardly. The holding rod members 211a and 211b are vertically slidably held by the upper and lower projections 203a and 205a and 203b and 205b, respectively, of the carrier member 197. The helical springs 213a and 213b are biased around the holding rod members 211a and 211b between the upper projections 203a and 203b and the larger portions 211La and 211Lb of the holding rod members 201a and 211b. Also, the holding rod members 211a and 211b are provided at their upper ends with stopping members 215a and 215b, respectively, and they are further provided at their lower ends with pads 217a and 217b, respectively. Thus, strictly stated, the carrier member 197 is resiliently held by the springs 213a and 213b which are held by the larger portions 211La and 211Lb of the holding rod members 211a and 211b. The pads 217a and 217b of the holding rod members 211a and 211b are held on the horizontal supporting plates 187a and 187b. Also, it will be readily understood that the carrier member 197 will be raised to along the holding rod members 211a and 211b and will be stopped by means of the stopping members 215a and 215b when it is pushed upwardly.

As shown by imaginary lines in FIG. 6, a pair of shock absorbers 219a and 219b of an air cylinder type having sliding rods 221a and 211b are provided to enable the holding rod members 211a and 211b to softly or shocklessly sit down on the supporting plates 187a and 187b after having been raised. The shock absorbers 219a and 219b are vertically disposed beneath the supporting plates 187a and 187b, respectively, with their sliding rods 221a and 221b upwardly slidably projected through the supporting plates 187a and 187b in contact with the pads 217a and 217b of the holding rod members 211a and 211b, respectively. Thus, when the holding rod members 211a and 211b are lowered back together with the carrier member 197 after having been raised up, the pads 217a and 217b of the holding rod members 211a and 211b will be initially softly held and then will shocklessly sit down on the supporting plates 187a and 187b.

As shown in FIG. 7, the mirror assembly 17 is connected with a conduit 223 from which the laser beam LB from the laser resonator 3 is delivered in the same manner as the first embodiment, and it is connected by an extendable conduit 225 to a movable tube member 227 which is formed at its upper portion with a thread 227t. The movable tube member 227 is vertically slidably held and guided by a ball bush assembly 229 held by a box-like housing member 231 which is fixedly secured to the carrier member 197 shown in a side view. However, the movable tube member 227 is held from rotating by a key 233 which is fixed to the carrier member 197 and engages with a holding member 235 secured to the top portion of the movable tube member 227.

Also, the movable tube member 227 is connected at its lowermost end with a sleeve-like cooling member 237 which has an annular bore 237b for coolant and detachably holds a condenser lens 239 held by a sleeve-like holding member 241. The sleeve-like cooling member 237 is vertically slidably held by a sleeve-like bush member 243 which is fixedly secured to the shelf-like plate 199. The sleeve-like cooling member 237 held from rotating in the sleeve-like bush member 243 by a key 245. Thus, it will be understood that the movable tube member 227 and the sleeve-like cooling member 237 are integrally and vertically movably held by the ball bush assembly 229 and the sleeve-like bush member 243 to move with the condenser lens 239. Also, it will be readily understood that the laser beam LB delivered from the laser resonator 3 through the conduit 223 is reflected by the mirror assembly 17 and is then further transmitted through the movable tube member 227 to be focussed by the condenser lens 239.

In order to vertically adjustably move the movable tube member 227, a worm wheel 247 is engaged with the thread 227t of the movable tube member 227 and is rotatably held by bearings 249 which are fixedly held in the box-like housing member 231 fixed to the carrier member 197. The worm wheel 247 is engaged with a worm 251 which has a bevel gear 253 and is horizontally rotatably held on the box-like housing member 231. The bevel gear 253 of the worm 251 is engaged with another gear 255 driven by a motor 257 which is mounted on the box-like housing member 231 by means of a bracket 259. Also, in order to read out the vertical position of the movable tube member 227, a dial gage 261 having a spindle 263 is provided on the holding member 235 fixed at the top portion of the movable tube member 227. The spindle 263 of the dial gage 261 is vertically held on a plate member 265 fixed to the box-like housing member 231. Thus, it will be now understood that the movable tube member 227 can be vertically adjustably moved together with the condenser lens 239 by driving the motor 257 to adjust the focal position of the condenser lens 239.

In order to apply the laser beam LB together with the assisting gas to the workpiece W to be processed, a nozzle assembly 267 is detachably provided at the lower end of the movable tube member 227 more or less in the same manner as the first embodiment. The nozzle assembly 267 comprises a nozzle 269 formed with a thread 269t and vertically slidably held in a sleeve-like holding member 271. The nozzle assemble 267 comprises also a sleeve-like casing 273 integrally fixed to an annular member 275 which has a plurality of upwardly projecting clamping nails 277 each having a flange 277f. In the preferred embodiment, the sleeve-like casing is provided with a pressure gage 279 for the pressure of the assisting gas applied to the workpiece W together with the laser beam LB. The sleeve-like holding member 271 holding the nozzle 269 is held in the sleeve-like casing by a helical spring 281 so that it can be adjusted in horizontal position by a plurality of adjusting bolts 283 shown in FIG. 6. As shown in FIG. 7 the nozzle 269 vertically slidably held in the sleeve-like holding member 271 is so arranged as to the adjusted in vertical position by an annular adjusting nut 285 which is engaged with the thread 269t of the nozzle 269 and is held by an annular holding member 287 having an opening 287-0. Also, the nozzle 269 and the sleeve-like holding member 271 are held from rotating by pins 289 and 291, respectively, which can be vertically moved therewith.

Furthermore, the nozzle assembly 267 is provided with a plurality of castor rollers 293 for coping with bends or warps of the workpiece W is also provided and with a detecting means 295 for protecting the nozzle assembly 267 against obstructions in the same manner as the first embodiment.

Figure 8:
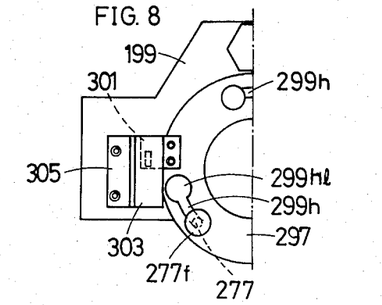
FIG. 8 is a sectional view taken along the line VIII—VIII of FIG. 6.

Referring to FIG. 8 as well as FIGS. 6 and 7, in order to detachably hold the nozzle assembly 267 at the lower end of the movable tube member 227, the clamping nails 277 of the nozzle assembly 267 are so arranged as to upwardly project through holes 199h, shown only in FIG. 7, which are vertically formed through the shelf-like plate 199 of the carrier member 197. On the other hand, an annular disk 297 having a lever 299 is horizontally and rotatably provided around the periphery of the sleeve-like bush member 243 in a manner such that it can be turned on the upper surface of the shelf-like plate 199 by the lever 299. Also, as best shown in FIG. 8, the annular disk 297 is formed with arcuate holes 299h each having a larger portion 299hl through which the flanges 277f of the clamping nails 277 can be projected upwardly so that the clamping nails 277 can be clamped on the shelf-like plate 199 when the lever 299 is turned. Furthermore, the annular disk 297 is provided with a dog member 301 which is so arranged as to be brought into contact with a detecting means 303 such as a limit switch when the lever 299, best shown in FIG. 7, is turned to clamp the clamping nails 277. As shown in FIGS. 6 and 8, the detecting means 303 is mounted on the shelf-like plate 199 by means of a bracket 305 and it is so arranged as to generate a safety signal when contacted by the dog member 301. Thus, as shown in FIG. 7, it will be understood that the nozzle assembly 267 can be secured beneath the condenser lens 239 by turning the lever 299 with the clamping nails 277 upwardly projected through the hole 199h of the shelf-like plate 199. Also, the nozzle assembly 267 can be removed therefrom by turning the lever 299 to change the condenser lens 239.

As shown in FIG. 7, in order to raise the carrier member 197 together with the movable tube member 227, there is provided a pneumatic or hydraulic motor 307 which has a piston and rod 309 and is all the same in construction and function as the pneumatic or hydraulic motor 155 of the first embodiment best shown in FIG. 4. The piston and rod 309 of the pneumatic or hydraulic motor 307 is connected to the shelf-like plate 199 of the carrier member 197 by means of a sleeve member 311 in a manner such that the carrier member 197 can resiliently upwardly move during processing operations when the piston and rod 309 are fully extended. Also, as shown in FIG. 6, a plurality of dog members 312a and 312b are provided on the carrier member 197 by means of rod members 313a and 313b and a pair of detecting means 315a and 315b such as limit switches are provided on the side plates 185a and 185b. The dog members 312a and 312b and the detecting means 315a and 315b are so arranged as to perform, as a whole, more or less the same functions as the dog member 167 and the detecting means 171, 173 and 175 of the first embodiment shown in FIG. 3. Thus, the carrier member 197 and the movable tube member 227 are lowered with the piston and rod 309 of the pneumatic or hydraulic motor 307 fully extended during processing operations so that they can resiliently move upwardly, but they can also be raised by working the pneumatic or hydraulic motor 307 in the same manner as the first embodiment.

Figure 9:
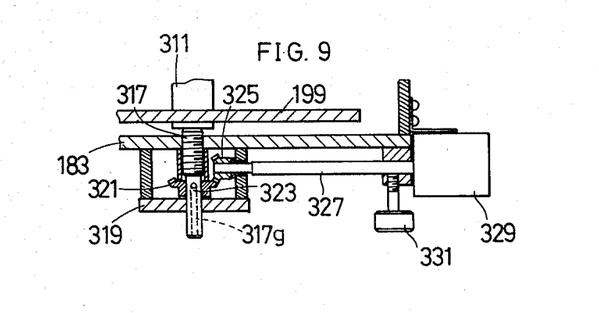
FIG. 9 is a sectional view taken along the line IX—IX of FIG. 7.

As shown in FIG. 9 as well as FIGS. 6 and 7, an adjusting screw 317 having an axial groove 317g at its periphery is provided in order to adjustably set the vertical position or the lowermost limit of the carrier member 197 according to the thicknesses of the workpiece W to be processed. The adjusting screw 317 is rotatably and vertically movably held by a holding member 319 beneath the lower plate 183 so as to upwardly project through the lower plate 183 and hold the bottom of the carrier member 197. Also, in order to vertically move the carrier member 197, the adjusting screw 317 is so arranged as to be rotated and vertically moved by a bevel gear 321 which has a pin 323 engaging with the axial groove 317g of the adjusting screw 317. The bevel gear 321 is engaged with another bevel gear 325 having an elongated shaft 327 which is provided at its end with a knob 329 and is normally stopped from rotating by a tightening screw 331. Thus, it will be understood from the above description that the vertical position of the carrier member 197 and the movable tube member 227 can be adjusted according to the thicknesses of the workpiece W by manually rotating the knob 329 to adjust the focal position of the condenser lens 239.

Although a preferred form of the present invention has been illustrated and described, it should be understood that the device is capable of modification by one skilled in the art without departing from the principles of the invention. Accordingly, the scope of the invention is to be limited only by the claims appended hereto.

I claim:

1. A laser machine having a head assembly for processing a workpiece, comprising:

a lens means, disposed in the head assembly, for condensing a laser beam;

a nozzle means, arranged beneath the lens means, for applying the laser beam to the workpiece;

means, connected in the head assembly, for vertically moving the lens means and the nozzle means together in fixed relation to each other;

wherein said vertically moving means includes:

a movable tube means, arranged above the lens means, for allowing the lens means to resiliently move upwardly;

a first helical spring means for biasing the movable tube means downwardly;

a ring-like holding means, arranged between the lens means and the nozzle means, for allowing the nozzle means to resiliently move upwardly; and a second helical spring means for biasing the ring-like holding means downwardly.

2. The laser machine, according to claim 1, wherein: said nozzle means is detachably mounted onto a lower end of the head assembly.

3. The laser machine, according to claim 1, further comprising:

means, connected to the head assembly, for counterbalancing the weight of the nozzle means.

4. The laser machine, according to claim 1, wherein: said vertically moving means further includes a motor.

5. The laser machine, according to claim 1, further comprising:

means, connected in the head assembly, for absorbing shocks caused by vertical movement of the lens means and the nozzle means.

* * * * *